(12) United States Patent
Gu

(10) Patent No.: US 12,154,584 B2
(45) Date of Patent: *Nov. 26, 2024

(54) METHOD AND APPARATUS FOR NOISE REDUCTION, ELECTRONIC DEVICE, AND STORAGE MEDIUM

(71) Applicant: Telink Semiconductor (Shanghai) Co., Ltd., Shanghai (CN)

(72) Inventor: Xiaowen Gu, Shanghai (CN)

(73) Assignee: TELINK SEMICONDUCTOR (SHANGHAI) CO., LTD., Shanghai (CN)

( * ) Notice: Subject to any disclaimer, the term of this patent is extended or adjusted under 35 U.S.C. 154(b) by 332 days.

This patent is subject to a terminal disclaimer.

(21) Appl. No.: 17/688,806

(22) Filed: Mar. 7, 2022

(65) Prior Publication Data

US 2022/0293118 A1 Sep. 15, 2022

(30) Foreign Application Priority Data

Mar. 10, 2021 (CN) .......................... 202110261296.2

(51) Int. Cl.
*G10L 21/0216* (2013.01)
*G10L 15/02* (2006.01)

(52) U.S. Cl.
CPC .......... *G10L 21/0216* (2013.01); *G10L 15/02* (2013.01)

(58) Field of Classification Search
CPC ............................ G10L 21/0216; G10L 15/02
USPC .......................... 381/71.1, 92; 704/246, 251, 704/256.1–256.8, 233

See application file for complete search history.

(56) References Cited

U.S. PATENT DOCUMENTS

| | | | |
|---|---|---|---|
| 10,595,149 B1 | 3/2020 | Lovitt et al. | |
| 2010/0131269 A1 | 5/2010 | Park et al. | |
| 2010/0296668 A1 | 11/2010 | Lee et al. | |
| 2012/0215519 A1 | 8/2012 | Park et al. | |
| 2014/0223310 A1* | 8/2014 | Divay | G10L 15/22 715/727 |
| 2018/0233125 A1 | 8/2018 | Mitchell et al. | |
| 2020/0135163 A1 | 4/2020 | Lovitt et al. | |

OTHER PUBLICATIONS

European Search Report issued Jul. 29, 2022 in European Application No. 22160855.7.

* cited by examiner

*Primary Examiner* — George C Monikang
(74) *Attorney, Agent, or Firm* — Panitch Schwarze Belisario & Nadel LLP

(57) ABSTRACT

A method and an apparatus for noise reduction, an electronic device, and a storage medium are disclosed. The method includes: generating a reference noise signal by picking up external noise; identifying a keyword in the reference noise signal, and determining a direction of desired speech based on the identified keyword; extracting a desired speech signal in the direction of desired speech, and acquiring an unwanted noise signal by filtering out the desired speech signal from the reference noise signal; and generating inverse noise by filtering the unwanted noise signal, to cancel the external noise. Thus, this method not only makes it convenient for users to receive desired speech by effectively extracting the desired speech, but also improves the noise reduction effect by eliminating the unwanted noise.

8 Claims, 5 Drawing Sheets

METHOD AND APPARATUS FOR NOISE REDUCTION, ELECTRONIC DEVICE, AND STORAGE MEDIUM

CROSS-REFERENCE TO RELATED PATENT APPLICATION

The present disclosure claims the benefit of and priority to Chinese Patent Application No. 202110261296.2 filed on Mar. 10, 2021, the entire disclosure of which is incorporated by reference herein.

TECHNICAL FIELD

The present disclosure relates to the field of communication technologies, in particular to a method and an apparatus for noise reduction, an electronic device, and a storage medium.

BACKGROUND

In the existing active noise cancellation (ANC) system, external noise is firstly picked up by a reference microphone to acquire a reference noise signal. The reference noise signal is then filtered by an ANC filter to generate inverse noise for cancelling the external noise. The uncancelled external noise is then picked up as residual noise by an error microphone to acquire an error noise signal, which is in turn used by an adaptive controller to update coefficients of the ANC filter, such that the inverse noise can better cancel influences of the external noise in the headset.

In occasions such as a waiting room or lounge, the user wearing the headset desires to not only suppress the external noise but also pay constant attention to voice notifications from staff or announcements of the station or airport. The desired sounds such as the staff voices or announcements may be cancelled as noise by the existing ACN filter. In addition, the noise cancellation effect cannot be achieved by a full transparency mode, and some headsets may allow human voices to pass through via manual settings but still fail to solve the noise problem caused by surrounding human voices. Therefore, the current noise reduction headsets cannot identify the desired speech and unwanted noise, which may cause the desired speech to be completely filtered out, or cause unwanted noise to be too loud resulting in a poor user experience.

SUMMARY

Embodiments of the present disclosure provide a method and an apparatus for noise reduction, an electronic device, and a storage medium to solve the problem in the related art. The technical solutions are as follows:

On a first aspect, embodiments of the present disclosure provide a method of noise reduction, which includes:
generating a reference noise signal by picking up external noise;
identifying a keyword in the reference noise signal, and determining a direction of desired speech based on the identified keyword;
extracting a desired speech signal in the direction of desired speech, and acquiring an unwanted noise signal by filtering out the desired speech signal from the reference noise signal; and
generating inverse noise by filtering the unwanted noise signal, to cancel the external noise.

In an embodiment, identifying the keyword in the reference noise signal includes:
identifying the keyword in the reference noise signal with a speech recognition model consisting of a Gaussian mixture model and a Hidden Markov model, or with a convolutional neural network model.

In an embodiment, determining the direction of desired speech based on the identified keyword includes:
acquiring, by a beamformer, the reference noise signal and processing the reference noise signal based on the identified keyword to determine the direction of desired speech.

In an embodiment, extracting the desired speech signal in the direction of desired speech includes:
acquiring, by a filter, reference noise signals in the direction of desired speech and filtering out the reference noise signal greater than a preset frequency value; and
taking a retained reference noise signal as the desired speech signal.

In an embodiment, extracting the desired speech signal in the direction of desired speech further includes:
eigen-decomposing the retained reference noise signal with a principal component analysis algorithm to acquire N eigenvalues $D_i$ (i=1, 2, . . . N) and corresponding N sets of singular vectors $U_i$ and $V_i$, wherein N refers to the number of error microphones; and
selecting an eigenvalue $D_j$ which is greater than a preset eigenvalue to calculate the desired speech signal $S=U_j*D_j*V_j$.

In an embodiment, generating the inverse noise by filtering the unwanted noise signal includes:
generating an error noise signal by picking up residual noise;
updating filtering parameters with the error noise signal and the unwanted noise signal; and
generating the inverse noise by filtering the unwanted noise signal with the filtering parameters as updated.

On a second aspect, embodiments of the present disclosure provide an apparatus for noise reduction, which includes:
a reference noise generating module, configured to generate a reference noise signal by picking up external noise;
a speech direction determining module, configured to identify a keyword in the reference noise signal, and determine a direction of desired speech based on the identified keyword;
a desired speech extracting module, configured to extract a desired speech signal in the direction of desired speech;
an unwanted noise acquiring module, configured to acquire an unwanted noise signal by filtering out the desired speech signal from the reference noise signal; and
an unwanted noise filtering module, configured to generate inverse noise by filtering the unwanted noise signal, to cancel the external noise.

In an embodiment, the speech direction determining module includes:
a beamforming sub-module, configured for a beamformer to acquire the reference noise signal and process the reference noise signal based on the identified keyword to determine the direction of desired speech.

In an embodiment, the desired speech extracting module includes:
a filtering sub-module, configured for a filter to acquire reference noise signals in the direction of desired speech and filter out the reference noise signal greater than a preset frequency value; and a desired speech extracting sub-module, configured to take a retained reference noise signal as the desired speech signal.

In an embodiment, the desired speech extracting module further includes:

an eigen-decomposing sub-module, configured to eigen-decompose the retained reference noise signal with a principal component analysis algorithm to acquire N eigenvalues $D_i$ (i=1, 2, . . . N) and corresponding N sets of singular vectors $U_i$ and $V_i$, wherein N refers to the number of error microphones; and a desired speech signal calculating sub-module, configured to select an eigenvalue $D_j$ that is greater than a preset eigenvalue to calculate the desired speech signal $S=U_j*D_j*V_j$.

In an embodiment, the unwanted noise filtering module includes:

an error noise generating sub-module, configured to generate an error noise signal by picking up residual noise;

a filtering parameter updating sub-module, configured to update filtering parameters with the error noise signal and the unwanted noise signal; and an unwanted noise filtering sub-module, configured to generate the inverse noise by filtering the unwanted noise signal with the filtering parameters as updated.

On a third aspect, a headset for noise reduction is provided, which includes:

at least one processor; and a memory, communicatively connected with the at least one processor;

wherein the memory has instructions executable by the at least one processor stored therein, such that the instructions, when executed by the at least one processor, cause the at least one processor to execute any one of the aforesaid methods.

On a fourth aspect, a non-transitory computer-readable storage medium having computer instructions stored therein is provided. The computer instructions are configured to cause a computer to perform the method according to any one of the aforesaid aspects.

An embodiment of the present disclosure has the following advantages or beneficial effects. By identifying the keyword emitted by the desired speech source, the microphone array of the headset may be triggered to pick up the external noise in respective directions. Then, the direction of desired speech source is determined based on the identified keyword, and the desired speech in the direction of desired speech source is extracted by a human voice extractor. The unwanted noise signal is filtered out when no keyword is identified, which eliminates the unwanted noise caused by the human voice not related to the desired speech. Thus, this method not only makes it convenient for users to receive desired speech by effectively extracting the desired speech, but also improves the noise reduction effect by eliminating the unwanted noise.

Other effects of the aforesaid optional aspects will be described below in conjunction with specific embodiments

BRIEF DESCRIPTION OF THE DRAWINGS

The drawings means to facilitate understanding of the solution, and do not constitute a limitation to the present disclosure. In the drawings.

DETAILED DESCRIPTION

The exemplary embodiments of the present disclosure are described below in conjunction with the accompanying drawings, which include various details of the embodiments of the present disclosure to aid in understanding, and should be considered merely exemplary. Accordingly, one of ordinary skill in the art shall recognize that various changes and modifications may be made to the embodiments described herein without departing from the scope and spirit of the present disclosure. For the sake of clarity and brevity, descriptions of well-known functions and structures have been omitted from the following descriptions.

Figure 1:
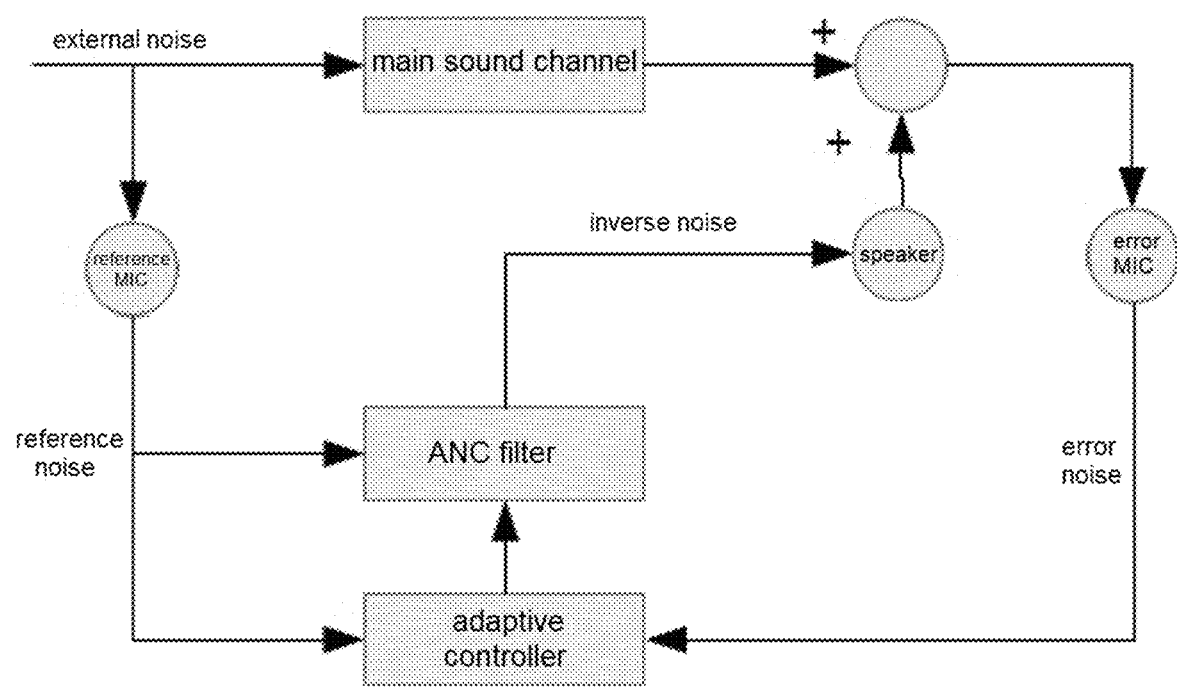
FIG. 1 is a schematic structural diagram of an active noise cancellation system according to the prior art.
Figure 2:
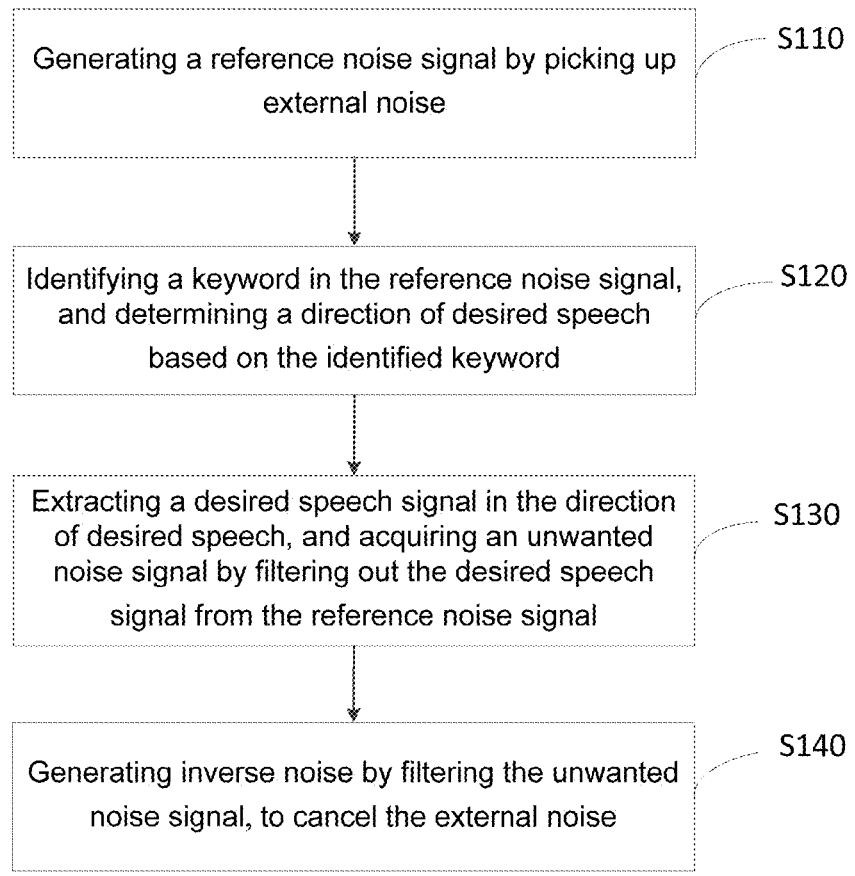
FIG. 2 is a schematic diagram of a method of noise reduction according to an embodiment of the present disclosure.

FIG. 1 is a schematic structural diagram of an existing active noise cancellation system. The active noise cancellation system in the prior art cannot identify the desired speech and unwanted noise, which may cause the desired speech to be completely filtered out, or cause unwanted noise to be too loud resulting in a poor user experience. In order to this problem, this embodiment provides a method of noise reduction, which as shown in FIG. 2 includes following steps:

S110: generating a reference noise signal by picking up external noise;

S120: identifying a keyword in the reference noise signal, and determining a direction of desired speech based on the identified keyword;

S130: extracting a desired speech signal in the direction of desired speech, and acquiring an unwanted noise signal by filtering out the desired speech signal from the reference noise signal; and S140: generating inverse noise by filtering the unwanted noise signal, to cancel the external noise.

Figure 3:
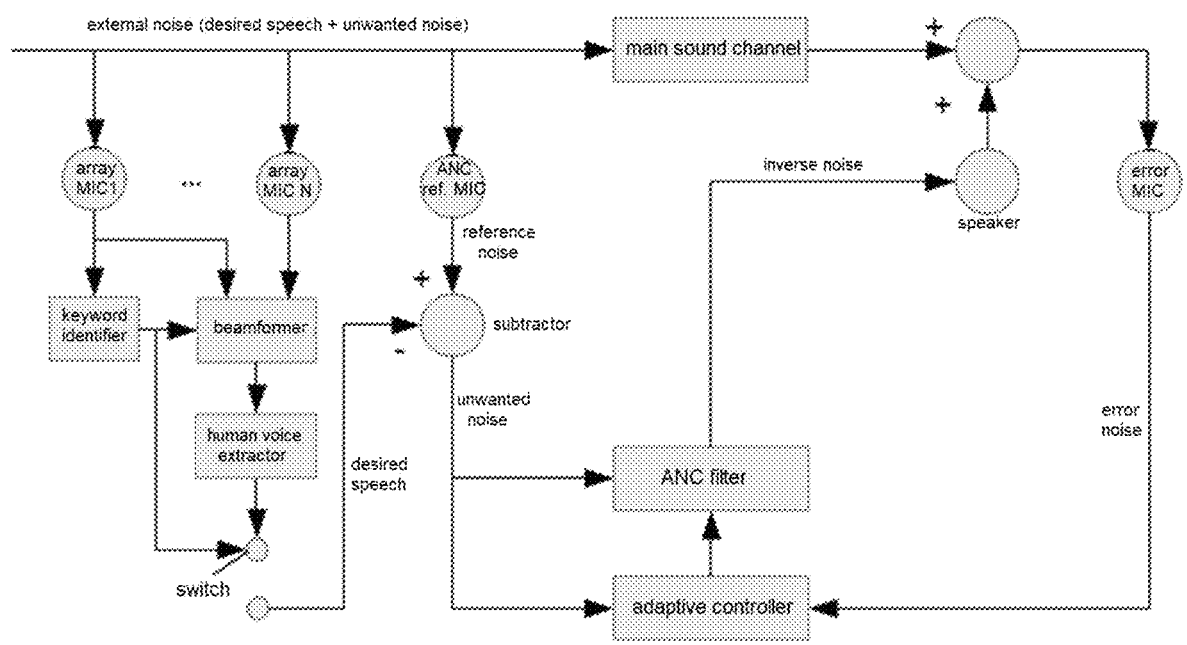
FIG. 3 is a schematic structural diagram of a system for noise reduction according to an embodiment of the present disclosure.

In an example, as shown in FIG. 3, an active noise cancellation (ANC) system is provided on a headset housing. The ANC system includes N microphone arrays arranged in specific positions, a reference microphone (RM), an error microphone (EM), a keyword identifier, a beam-former, a human voice extractor, a subtractor, an adaptive controller, and an ANC filter. The 1 to N microphone arrays pick up the external noise that may include both desired speech and unwanted noise. The noise signal picked up by the array microphone closest to the reference microphone (array microphone 1 in FIG. 3) is fed to the keyword identifier. The keyword identifier identifies the keyword, which may be set in advance based on the desired speech, from the noise signal picked up by the array microphone 1. For example, the keywords in the desired speech "please bring your ID card for ticket checking" may be "ID card" and "ticket checking"; or the keywords in the desired speech "the plane will take off in 15 minutes, please board at Gate C if you have not yet boarded" may be "plane taking off" and "Gate C", and the like. Two directions of desired speech may be positioned based on the keyword "ID card". The speeches in one direction may include "please bring your ID card for ticket checking" and "have found a passengers ID card, please reclaim it from the Lost and Found Office". Thus, the keyword as selected shall cover as much as possible the actual content of the speech to improve the accuracy in speech recognition and direction determination, and thereby effectively avoid false triggering. The keyword may be set automatically, which requires no manual setting. The array microphone does not start when no keyword is identified, and starts if the keyword is identified successfully. At this point, the beamformer determines the direction of desired speech based on the identified keyword. The signal as picked up by the array microphone N is an omni-directional noise signal which is then input to the beamformer to generate the beam in the direction of desired speech. Afterwards, the beam in the direction of desired speech is input to the human voice extractor to extract the desired speech signal. If the keyword is identified successfully, a control switch is closed to input the desired speech signal extracted by the human voice extractor into the subtractor. Then, the reference noise signal is generated from the external noise picked up by the reference microphone, and the unwanted noise signal is acquired by filtering out the desired speech signal from the reference noise signal with the subtractor. The desired speech signal is retained and received by the user, and the unwanted noise signal is input to the adaptive controller. Meanwhile, the adaptive controller acquires the error noise signal generated from the residual noise picked up by the error microphone, and updates the filtering parameter with the error noise signal and the unwanted noise signal. The updated filtering parameters are transmitted to the ANC filter that filters the unwanted noise signal with the updated filtering parameters to generate an inverse noise signal. Then, the inverse noise signal becomes the inverse noise via the speaker and superimposed with the external noise output from the main channel to cancel the external noise, and the residual noise after cancellation is picked up again by the error microphone for the next round of noise reduction process.

According to this embodiment, by identifying the keyword emitted by the desired speech source, the microphone array of the headset may be triggered to pick up the external noise in respective directions. Then, the direction of desired speech source is determined based on the identified keyword, and the desired speech in the direction of desired speech source is extracted by a human voice extractor. The unwanted noise signal is filtered out when no keyword is identified, which eliminates the unwanted noise caused by the human voice not related to the desired speech. Thus, this method not only makes it convenient for users to receive desired speech by effectively extracting the desired speech, but also improves the noise reduction effect by eliminating the unwanted noise.

In an embodiment, identifying the keyword in the reference noise signal in S120 includes:

S121: identifying the keyword in the reference noise signal with a speech recognition model consisting of a Gaussian mixture model and a Hidden Markov model, or with a convolutional neural network model.

In an example, the keyword identifier may be turned off by default, and wake up when energy of the speech signal exceeds a preset threshold that is an empirical value in debugging. The keyword identifier may pre-process the speech signal as received, and may perform pre-emphasis to achieve spectral equalization, re-sampling to achieve rate matching, and window adding after frame splitting to acquire the speech data in frames. Then, the phonetic feature, such as a classical Mel frequency cepstral coefficient (MFCC) feature, is extracted for each frame of speech data, and the MFCC feature is a feature widely applied in the automatic speech-speaker identification. The MFCC feature is taken as input data and runs through a trained Gaussian mixture HMM (GMM-HMM) or a neural network HMM (NN-HMM) to acquire a corresponding probability score, and when the probability score is higher than the preset threshold (empirical value in debugging), it is deemed that the keyword is identified successfully.

Identifying the keyword in speech may include two steps. The first step is to identity the frames as states with the Gaussian mixture model (GMM), and the second step is to combine the states into phonemes with the hidden Markov model (HMM), and combine the phonemes into words. The convolutional neural network model may be trained with a training data set to acquire a trained neural network model, and the keyword in the reference noise signal is identified with the trained neural network model. The GMM herein belongs to an early recognition model, which is characterized by having a relatively simple structure but has a low recognition rate. The HMM has a high recognition rate in spite of a slightly more complex structure. The two models are selected according to the hardware resources as implemented.

In an embodiment, determining the direction of desired speech based on the identified keyword in S120 includes:

S122: acquiring, by a beamformer, the reference noise signal and processing the reference noise signal based on the identified keyword to determine the direction of desired speech.

In an example, a technique that propagates wireless signals (electromagnetic waves) in a specific direction only is called beamforming. The beamforming allows the energy of the signal to be concentrated in the direction of the receiver to improve the utilization efficiency of spectrum. The beamforming may be implemented with beamforming algorithms such as a classical minimum variance distortionless response (MVDR) algorithm, or a generalized sidelobe canceller (GSC). As an adaptive beamforming algorithm based on the maximum signal-to-noise ratio (SINR) criterion, the MVDR algorithm may adaptively enable the array to be output in a desired direction with a minimized power but a maximized SINR. The GSC is an adaptive beamforming algorithm for a generalized sidelobe canceller with high performance and low computational effort. Of course, the beamforming algorithms adopted by the beamformer include, but are not limited to, the aforesaid two algorithms, and other algorithms may be adopted and are all within the protection scope of this embodiment.

In an embodiment, extracting the desired speech signal in the direction of desired speech in S130 includes:

S131: acquiring, by a filter, reference noise signals in the direction of desired speech and filtering out the reference noise signal greater than a preset frequency value; and S132: taking a retained reference noise signal as the desired speech signal.

In an example, the human voice extractor may include a filter by which the reference noise signal in the direction of desired voice is equalized and filtered. Then, the reference noise signal greater than the preset frequency value is filtered out, and the retained reference noise signal is taken as the desired speech signal. The preset frequency value may be set based on the debugging experience.

In an embodiment, extracting the desired speech signal in the direction of desired speech in S130 further includes:

S133: eigen-decomposing the retained reference noise signal with a principal component analysis algorithm to acquire N eigenvalues $D_i$ (i=1, 2, ... N) and corresponding N sets of singular vectors $U_i$ and $V_i$, with N being the number of error microphones; and S134: selecting an eigenvalue $D_j$ that is greater than a preset eigenvalue to calculate the desired speech signal $S=U_j*D_j*V_j$.

In an example, the human voice extractor may include a filter and a signal feature analyzer. The filter equalizes and filters the reference noise signal in the direction of desired voice, and the reference noise signal greater than the preset frequency value is filtered out. Then, the retained reference noise signal is eigen-decomposed with a principal component analysis (PCA) algorithm, and the retained reference noise signal herein is a signal in the direction of desired speech and may originate from N reference noise sequences $X_{err}$ output by N reference microphones. The retained reference noise signal is input to the signal feature analyzer that maps the signal onto a space orthogonal to each other with the classical PCA algorithm to acquire eigenvalues and eigenvectors as feature parameters. That is, a sequence of eigenvalues $D_i$ (i=1, 2, ... N) composed of N eigenvalues corresponds to N sets of singular vectors $U_i$ and $V_i$ (i=1, 2, ... N) by ordinal number, and the sequence of eigenvalues D and the corresponding set of singular vectors U and V are taken as a feature parameter set S. The number of eigenvalues and eigenvectors is same as the number of microphones. The eigenvalue $D_j$ which is greater than a preset eigenvalue is selected to calculate the desired speech signal $S=U_j*D_j*V_j$. For example, the eigenvalue of j=1 is the maximum eigenvalue, and the maximum eigenvalue $D_1$ and the corresponding set of singular vectors $U_1$ and $V_1$ are adopted to return the human voice signal S. The preset eigenvalue may be set adaptively based on experience and is all within the protection scope of this embodiment.

In an embodiment, S140 includes:
S141: generating an error noise signal by picking up residual noise;
S142: updating filtering parameters with the error noise signal and the unwanted noise signal; and
S143: generating inverse noise by filtering the unwanted noise signal with the filtering parameters as updated.

Figure 4:
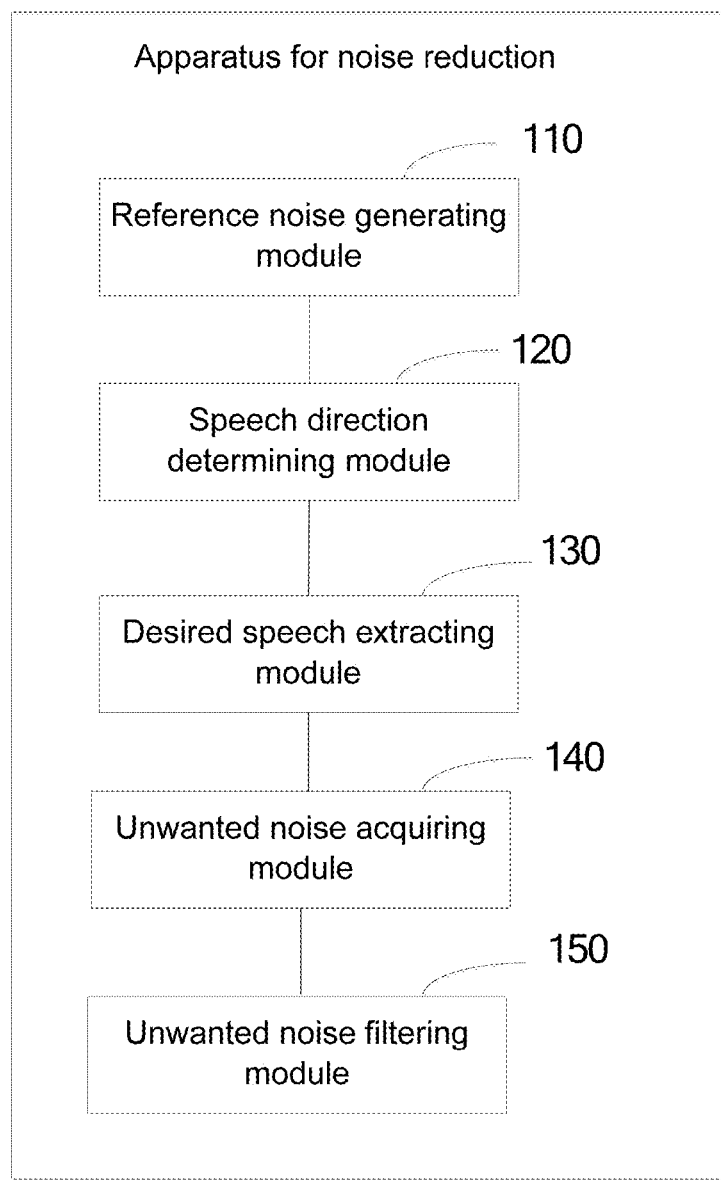
FIG. 4 is a schematic structural diagram of an apparatus for noise reduction according to an embodiment of the present disclosure.

In another specific embodiment, an apparatus for noise reduction as shown in FIG. 4 is provided, which includes:
a reference noise generating module 110, configured to generate a reference noise signal by picking up external noise;
a speech direction determining module 120, configured to identify a keyword in the reference noise signal, and determine a direction of desired speech based on the identified keyword;
a desired speech extracting module 130, configured to extract a desired speech signal in the direction of desired speech;
an unwanted noise acquiring module 140, configured to acquire an unwanted noise signal by filtering out the desired speech signal from the reference noise signal; and
an unwanted noise filtering module 150, configured to generate inverse noise by filtering the unwanted noise signal, to cancel the external noise.

In an embodiment, the speech direction determining module includes:
a beamforming sub-module, configured for a beamformer to acquire the reference noise signal and process the reference noise signal based on the identified keyword to determine the direction of desired speech.

In an embodiment, the desired speech extracting module includes:
a filtering sub-module, configured for a filter to acquire reference noise signals in the direction of desired speech, and filter out the reference noise signal greater than a preset frequency value; and
a desired speech extracting sub-module, configured to take a retained reference noise signal as the desired speech signal.

In an embodiment, the desired speech extracting module further includes:
an eigen-decomposing sub-module, configured to eigen-decompose the retained reference noise signal with a principal component analysis algorithm to acquire N eigenvalues $D_i$ (i=1, 2, ... N) and corresponding N sets of singular vectors $U_i$ and $V_i$, with N being the number of error microphones; and
a desired speech signal calculating sub-module, configured to select an eigenvalue $D_j$ that is greater than a preset eigenvalue to calculate the desired speech signal $S=U_j*D_j*V_j$.

In an embodiment, the unwanted noise filtering module includes:
an error noise generating sub-module, configured to generate an error noise signal by picking up residual noise;
a filtering parameter updating sub-module, configured to update filtering parameters with the error noise signal and the unwanted noise signal; and
an unwanted noise filtering sub-module, configured to generate the inverse noise by filtering the unwanted noise signal with the filtering parameters as updated.

The functions of each module in the apparatus according to embodiments of the present disclosure may be found in the corresponding descriptions of the method and will not be repeated herein.

According to embodiments of the present disclosure, the present disclosure further provides an electronic device and a readable storage medium.

Figure 5:
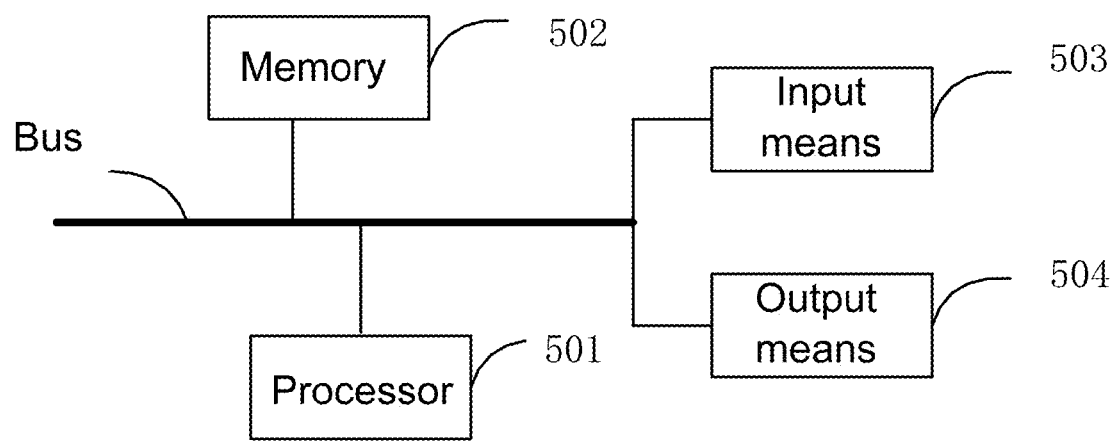
FIG. 5 is a block diagram of an electronic device for implementing a method of noise reduction according to an embodiment of the present disclosure.

FIG. 5 as shown is a block diagram of an electronic device for implementing a method of noise reduction according to an embodiment of the present disclosure. The electronic device is intended to denote various forms of digital computers, such as laptops, desktop computers, workstations, personal digital assistants, servers, blade servers, mainframe computers, and other suitable computers. The electronic device may also denote various forms of mobile devices, such as personal digital assistants, cellular phones, smart phones, wearable devices, and other similar computing devices. The components, the connection and relationship therebetween, and the functions thereof are shown herein as examples only and are not intended to limit the implementations of the present disclosure as described and/or claimed herein.

As shown in FIG. 5, the electronic device includes: one or more processors 501, a memory 502, and interfaces for connecting the components, including a high speed interface and a low speed interface. The components are interconnected with different buses and may be mounted on a common motherboard or mounted in other fashions according to needs. The processor may process instructions executed within the electronic device, and the instructions may include instructions stored in or on a memory to display graphical user interface (GUI) graphical information on an external input/output means (e.g., a display device coupled to an interface). In other embodiments, a plurality of processors and/or a plurality of buses may be adopted with a plurality of memories, if desired. Similarly, a plurality of electronic devices may be connected, with each device providing some of the necessary operations (e.g., as a server array, a group of blade servers, or a multiprocessor system). FIG. 5 is illustrating by taking one processor 501 as an example.

The memory 502 is the non-transitory computer readable storage medium according to the present disclosure. The memory has instructions stored therein executable by at least one processor to cause the at least one processor to execute one of the method of noise reduction according to the present disclosure. The non-transitory computer readable storage medium of the present disclosure has computer instructions stored therein that are adopted to cause the computer to execute the method of noise reduction according to the present disclosure.

The memory 502, as a non-transitory computer readable storage medium, may be configured to store non-transitory software programs, non-transitory computer executable programs, and modules, such as the program instructions/modules corresponding to one method of noise reduction according to the method embodiments of the present disclosure. The processor 501 performs various functional disclosures of the server and data processing by running non-transitory software programs, instructions, and modules stored in the memory 502, which means to implement one of the method of noise reduction according to the method embodiments of the present disclosure.

The memory 502 may include a program storing area and a data storing area. The program storing area may store an operating system, and an disclosure program required for at least one function, and the data storing area may store data created under the use of an electronic device according to a method of noise reduction. In addition, the memory 502 may include a high-speed random access memory and a non-transitory memory, such as at least one disk memory device, a flash memory device, or other non-transitory solid-state memory device. In some embodiments, the memory 502 optionally includes a memory disposed remotely relative to the processor 501, and such a remote memory may be connected to the electronic device via a network. Examples of the network includes, but is not limited to, the Internet, a corporate intranet, a local area network, a mobile communication network, and a combination thereof.

The electronic device may further include an input means 503 and an output means 504. The processor 501, the memory 502, the input means 503 and the output means 504 may be connected via a bus or other fashions, and FIG. 5 is illustrated by taking the connection via a bus as an example.

The input means 503 may receive input numeric or character information, and generate the key signal input related to user settings and functional control of the electronic device, such as a touch screen, keypad, mouse, trackpad, touchpad, indicator stick, one or more mouse buttons, trackball, joystick, and other input means. The output means 504 may include a display device, an auxiliary lighting device (e.g., LED), a haptic feedback device (e.g., a vibration motor), and the like. The display device may include, but is not limited to, a liquid crystal display (LCD), a light emitting diode (LED) display, and a plasma display. In some embodiments, the display device may be a touch screen.

The various embodiments of the system and technique described herein may be implemented in a digital electronic circuit system, an integrated circuit system, an disclosure specific integrated circuit (ASIC), a computer hardware, a firmware, a software, and/or a combination thereof. The various embodiments may include the implementation in one or more computer programs that may be executed and/or interpreted on a programmable system including at least one programmable processor. The programmable processor may be a dedicated or general-purpose programmable processor that may receive data and instructions from a storage system, at least one input means, and at least one output means, and transfer data and instructions to the storage system, the at least one input means, and the at least one output means.

The computing programs (also referred to as programs, software, software disclosures, or code) include machine instructions for a programmable processor and may be implemented with a high-level procedural and/or object-oriented programming language, and/or an assembly/machine language. As used herein, the terms "machine readable medium" and "computer readable medium" refer to any computer program product, device, and/or apparatus (e.g., disk, CD-ROM, memory, programmable logic device (PLD)) adopted to provide machine instructions and/or data to a programmable processor, which includes a machine readable medium that receives machine instructions as machine-readable signals. The term "machine-readable signal" refers to any signal adopted to provide machine instructions and/or data to a programmable processor.

To provide interaction with a user, the system and technique described herein may be implemented on a computer. The computer has a display device (e.g., a cathode ray tube (CRT) or liquid crystal display (LCD) monitor) for displaying information to the user, and a keyboard and pointing device (e.g., a mouse or trackball) through which the user can provide input to the computer. Other types of devices may also be adopted to provide interaction with the user. For example, the feedback provided to the user may be any form of sensory feedback (e.g., visual feedback, auditory feedback, or haptic feedback), and the input from the user may be received in any form (including acoustic input, voice input, or haptic input).

The system and technique described herein may be implemented in a computing system including a backend component (e.g., as a data server), or a computing system including a middleware component (e.g., an application server), or a computing system including a frontend component (e.g., a user computer having a graphical user interface or a web browser through which a user may interact with implementations of the system and technique described herein), or a computing system including any combination of the backend component, the middleware component, or the frontend component. The components of a system may be interconnected by the digital data communication (e.g., a communication network) in any form or medium. Examples of the communication network include a local area network (LAN), a wide area network (WAN), and the internet.

The computer system may include a client and a server. The client and server are generally disposed distal from each other and typically interact over a communication network. The relationship between the client and the server is generated by computer programs that run on the corresponding computer and have a client-server relationship with each other.

It should be understood that the steps may be reordered, added or deleted by the various forms of process shown above. For example, the steps in the present disclosure may be performed in parallel or sequentially or in a different order, as long as the desired result of the technical solution disclosed in the present disclosure can be achieved, which is not limited herein.

The aforesaid embodiments do not constitute a limitation on the protection scope of the present disclosure. Those skilled in the art shall understand that various modifications, combinations, sub-combinations and substitutions may be made according to design requirements and other factors. The modification, equivalent replacement, improvement, or the like made according to the spirit and principle of the present disclosure shall be regarded as within the protection scope of the present disclosure.

What is claimed is:

1. A method of noise reduction, comprising:
generating a reference noise signal by picking up external noise;
identifying a keyword in the reference noise signal, and determining a direction of desired speech based on the identified keyword;
extracting a desired speech signal in the direction of desired speech, and acquiring an unwanted noise signal by filtering out the desired speech signal from the reference noise signal; and
generating inverse noise by filtering the unwanted noise signal, to cancel the external noise,
wherein extracting the desired speech signal in the direction of desired speech comprises:
acquiring a beamformed signal for the external noise by beamforming in the direction of desired speech;
filtering components with frequencies above a preset frequency value out of the beamformed signal to obtain a retained signal;
eigen-decomposing the retained signal with a principal component analysis algorithm to acquire N eigenvalues $D_i$ (i=1, 2, ... N) and corresponding N sets of singular vectors $U_i$ and $V_i$, wherein N refers to the number of microphones for the beamforming; and
selecting an eigenvalue $D_i$ that is greater than a preset eigenvalue to calculate the desired speech signal $S=U_i*D_i*V_i$.

2. The method according to claim 1, wherein identifying the keyword in the reference noise signal comprises:
identifying the keyword in the reference noise signal with a speech recognition model consisting of a Gaussian mixture model and a Hidden Markov model, or with a convolutional neural network model.

3. The method according to claim 1, wherein determining the direction of desired speech based on the identified keyword comprises:
acquiring, by a beamformer, the reference noise signal and processing the reference noise signal based on the identified keyword to determine the direction of desired speech.

4. The method according to claim 1, wherein generating the inverse noise by filtering the unwanted noise signal comprises:
generating an error noise signal by picking up residual noise;
updating filtering parameters with the error noise signal and the unwanted noise signal; and
generating the inverse noise by filtering the unwanted noise signal with the filtering parameters as updated.

5. An apparatus for noise reduction, comprising:
a reference noise generating module configured to generate a reference noise signal by picking up external noise;
a speech direction determining module configured to identify a keyword in the reference noise signal, and determine a direction of desired speech based on the identified keyword;
a desired speech extracting module configured to extract a desired speech signal in the direction of desired speech;
an unwanted noise acquiring module configured to acquire an unwanted noise signal by filtering out the desired speech signal from the reference noise signal; and
an unwanted noise filtering module configured to generate inverse noise by filtering the unwanted noise signal, to cancel the external noise,
wherein the desired speech extracting module comprises:
a filtering sub-module configured to filter components with frequencies above a preset frequency value out of a beamformed signal for the external noise to obtain a retained signal, wherein the beamformed signal for the external noise is acquired by beamforming in the direction of desired speech;
a desired speech extracting sub-module configured to take a retained reference noise signal as the desired speech signal;
an eigen-decomposing sub-module configured to eigen-decompose the retained reference noise signal with a principal component analysis algorithm to acquire N eigenvalues $D_i$ (i=1, 2, ... N) and corresponding N sets of singular vectors $U_i$ and $V_i$, wherein N refers to the number of error microphones; and
a desired speech signal calculating sub-module, configured to select an eigenvalue $D_i$ that is greater than a preset eigenvalue to calculate the desired speech signal $S=U_i*D_i*V_i$.

6. The apparatus according to claim 5, wherein the speech direction determining module comprises:
a beamforming sub-module configured for a beamformer to acquire the reference noise signal and process the reference noise signal based on the identified keyword to determine the direction of desired speech.

7. The apparatus according to claim 5, wherein the unwanted noise filtering module comprises:
an error noise generating sub-module configured to generate an error noise signal by picking up residual noise;
a filtering parameter updating sub-module configured to update filtering parameters with the error noise signal and the unwanted noise signal; and
an unwanted noise filtering sub-module configured to generate the inverse noise by filtering the unwanted noise signal with the filtering parameters as updated.

8. A non-transitory computer-readable storage medium having computer instructions stored therein, wherein the computer instructions are configured to cause a computer to perform a method of noise reduction according to claim 1.

* * * * *